United States Patent
Montjean

(10) Patent No.: US 6,704,568 B2
(45) Date of Patent: Mar. 9, 2004

(54) PROTECTION SYSTEM FOR AN ELECTRICITY NETWORK HAVING AN INFRARED DATA TRANSMISSION LINK USING THE WAP PROTOCOL

(75) Inventor: Dominique Montjean, Versailles (FR)

(73) Assignee: Alstom, Paris (FR)

( * ) Notice: Subject to any disclaimer, the term of this patent is extended or adjusted under 35 U.S.C. 154(b) by 484 days.

(21) Appl. No.: 09/773,565

(22) Filed: Feb. 2, 2001

(65) Prior Publication Data

US 2002/0032026 A1 Mar. 14, 2002

(30) Foreign Application Priority Data

Aug. 10, 2000 (FR) .............................. 00 10519

(51) Int. Cl.[7] ................................. H04Q 7/20
(52) U.S. Cl. ................... 455/423; 324/552; 379/56.1
(58) Field of Search ............................ 455/423–426, 455/67.11, 66.1; 324/552; 379/56.1

(56) References Cited

U.S. PATENT DOCUMENTS

| 4,107,778 | A | * | 8/1978 | Nii et al. ..................... 702/59 |
| 4,841,405 | A | * | 6/1989 | Udren ........................ 361/80 |
| 5,327,478 | A | * | 7/1994 | Lebowitz ..................... 379/40 |
| 5,839,093 | A | * | 11/1998 | Novosel et al. ............... 702/59 |
| 6,195,549 | B1 | * | 2/2001 | Nakajima ..................... 455/424 |
| 6,434,363 | B2 | * | 8/2002 | Rinne et al. ................ 455/66.1 |
| 6,587,671 | B1 | * | 7/2003 | Kanago et al. ........... 324/158.1 |
| 2001/0041566 | A1 | * | 11/2001 | Xanthos et al. ............. 455/423 |
| 2002/0090001 | A1 | * | 7/2002 | Beckwith ..................... 370/466 |

FOREIGN PATENT DOCUMENTS

| DE | 196 45 809 | 5/1998 | ............ G07C/3/00 |
| DE | 197 22 898 | 12/1998 | ............ H02H/7/22 |
| EP | 0 789 288 | 8/1997 | ......... G05B/19/042 |

OTHER PUBLICATIONS

European Search Report dated Apr. 23, 2001.

* cited by examiner

*Primary Examiner*—William Trost
*Assistant Examiner*—Sharad Rampuria
(74) *Attorney, Agent, or Firm*—Sughrue Mion, PLLC

(57) ABSTRACT

The digital protection system for a high voltage electricity network to instruct circuit breakers to open in the event of faults being detected by current and/or voltage sensors on the network lines 4 connected to the circuit breakers. The digital protection system includes an infrared data transmission link with a portable telephone. Transmissions between the digital protection system and the portable telephone uses the wireless application protocol WAP.

4 Claims, 1 Drawing Sheet

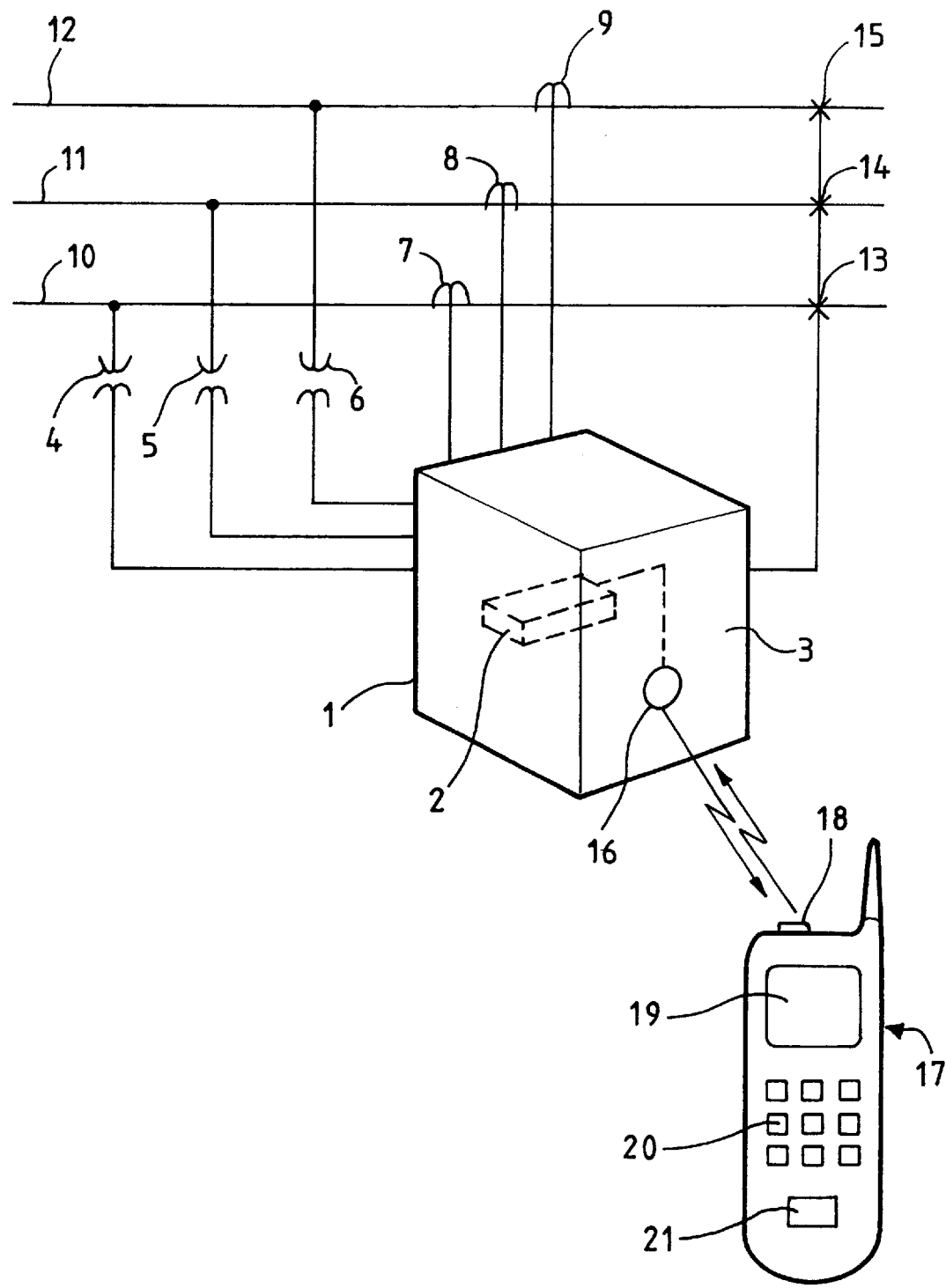

PROTECTION SYSTEM FOR AN ELECTRICITY NETWORK HAVING AN INFRARED DATA TRANSMISSION LINK USING THE WAP PROTOCOL

FIELD OF THE INVENTION

The invention relates to a digital protection system for an electricity network for causing circuit breakers to open in the event of faults being sensed by current and/or voltage sensors on lines of the network connected to the circuit breakers, the system including a data transmission link with a remote appliance.

BACKGROUND OF THE INVENTION

Such a protection system is used more particularly in high voltage electricity substations. It generally comprises a processor which receives the current values and/or voltage values as measured by the sensors mounted on the monitored lines of the network, which compares these measured current and/or voltage values with corresponding reference values, and which causes one or more circuit breakers to be opened when the measured current and/or voltage values exceed the corresponding reference values, so as to break the faulty line(s) of the electricity network.

Until now, in order to input reference values into the protection system, a portable computer has been used which is connected to the protection system by means of a data transmission link of the wire type. The portable computer makes it possible not only to input these reference values easily by means of its keyboard, but it also gives the operator a greater variety of options in modifying them and in displaying them on the screen. Nevertheless, because the portable computer is connected to the protection system by means of a wire type data transmission link, it can be subjected to disturbances and misfunctions due to the severe electromagnetic environment that exists inside an electricity substation around the protection system. In addition, a portable computer is a relatively fragile appliance that is bulky and ill-suited to the conditions of use in a high voltage electricity substation.

OBJECT AND BRIEF SUMMARY OF THE INVENTION

The object of the invention is to remedy those drawbacks.

To this end, the invention provides a digital protection system for an electricity network for causing circuit breakers to open in the event of faults being sensed by current and/or voltage sensors on lines of the network connected to the circuit breakers, the system including a data transmission link with a remote appliance, wherein said transmission link is an infrared link and said data transmission uses the wireless application protocol WAP.

In a particular embodiment of the protection system of the invention, the remote appliance is a mobile telephone, and in particular a so-called "second generation" mobile telephone fitted with an infrared communications port which can be configured to communicate via said port using the wireless application protocol WAP. This type of telephone is already available on the market and has a screen of reasonable dimensions together with keys and software for browsing the Internet. It will thus be understood that a protection system containing a program for inputting, modifying, and displaying values and that is compatible with Internet browser software can be parameterized very easily and at low cost by means of a mobile telephone that is small in size and low in cost. Furthermore, the radio data transmission link makes it possible to obtain very safe metallic isolation between the protection system and the mobile telephone.

BRIEF DESCRIPTION OF THE DRAWING

An embodiment of the digital protection system for an electricity network of the invention is described below and is shown in the sole FIGURE.

MORE DETAILED DESCRIPTION

The digital protection system for a high voltage electricity network as shown in the FIGURE comprises a box 1 containing the electronics and in particular a processor 2. The processor is connected in conventional manner to a man/machine interface (not shown) of the screen and keyboard type that is mounted on the front face 3 of the box.

The protection system further comprises current sensors 4, 5, and 6 and/or voltage sensors 7, 8, and 9 mounted on the network lines that are being monitored, in this case three lines 10, 11, and 12, together with respective circuit breakers 13, 14, and 15 which serve to break the lines when they are faulty. The current sensors and/or the voltage sensors are connected to the box 1 so as to provide measurement values concerning the currents and/or the voltages to the processor 2, and the circuit breakers are connected to the box 1 so as to receive break instruction signals from the processor 2. The processor 2 is programmed to compare the measured values with reference values stored in memory in the box 1 and to issue break instruction signals to the circuit breakers on detecting that the measured values have exceeded the reference values.

As can be seen in the FIGURE, an infrared communications port 16 is provided on the front face of the box 1 and is connected to the processor 2. The processor 2 is programmed to run an interactive program for inputting, modifying, and displaying reference values in the box 1, and for communicating via the infrared communications port 16 using the wireless application protocol WAP. The interactive input, modification, and display program is thus designed as an Internet service that is compatible with Internet browsing. Communication with the input, modification, and display program takes place remotely without using wires, via a cellular mobile telephone 17 which is likewise provided with an infrared communications port 18 and which communicates via its infrared communications port using the Internet wireless application protocol WAP. The telephone 17 is more particularly a cellular mobile telephone of the "second" generation as already available on the market, and it is provided with a screen 19, an alphanumeric keypad 20, and one or more Internet browsing keys 21. Such a telephone is functionally equivalent to a portable computer when it comes to inputting, modifying, or displaying reference values or other data concerning the protection system.

The invention claimed is:

1. A digital protection system for an electricity network for causing circuit breakers to open in the event of faults being sensed by current and/or voltage sensors on lines of the network connected to the circuit breakers, the system comprising a processor having an infrared data transmission link with a remote appliance that is physically separate from the digital protection system, wherein data transmissions use a wireless application protocol WAP.

2. The digital protection system of claim 1, in which the remote appliance is a mobile telephone.

3. The digital protection system of claim 2, wherein the processor is programmed to receive the measured current and/or voltage values, to compare these measured values with corresponding reference values stored in memory in the protection system, and to respond to said comparison by issuing open instruction signals to the circuit breakers.

4. The digital protection system of claim 2, wherein the processor is programmed to execute an interactive input, modification, and display program for said reference values in communication over the infrared link with the mobile telephone using the wireless application protocol WAP.

* * * * *